United States Patent
Yoshikawa

(10) Patent No.: US 9,948,827 B2
(45) Date of Patent: Apr. 17, 2018

(54) DATA PROCESSING APPARATUS, SYSTEM, AND METHOD FOR PROVIDING A SERVICE WITH A USE LIMIT THAT IS SET BASED ON ACQUIRED BIOLOGICAL INFORMATION

(71) Applicant: FUJI XEROX CO., LTD., Tokyo (JP)

(72) Inventor: Satoshi Yoshikawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/251,847

(22) Filed: Aug. 30, 2016

(65) Prior Publication Data

US 2017/0264785 A1 Sep. 14, 2017

(30) Foreign Application Priority Data

Mar. 8, 2016 (JP) .................. 2016-044356

(51) Int. Cl.
*H04N 1/44* (2006.01)
*H04N 1/00* (2006.01)

(52) U.S. Cl.
CPC ......... *H04N 1/442* (2013.01); *H04N 1/00344* (2013.01); *H04N 1/4433* (2013.01); *H04N 2201/0094* (2013.01)

(58) Field of Classification Search
CPC .. H04N 1/442; H04N 1/00344; H04N 1/4433; H04N 2201/0094
See application file for complete search history.

(56) References Cited

U.S. PATENT DOCUMENTS

| 6,202,092 B1 | 3/2001 | Takimoto | |
|---|---|---|---|
| 8,510,219 B1* | 8/2013 | Rose | G06Q 30/04 705/35 |
| 2005/0273865 A1* | 12/2005 | Slijp | H04N 1/4433 726/28 |
| 2013/0057900 A1* | 3/2013 | Ohta | G06K 15/00 358/1.14 |
| 2013/0090106 A1* | 4/2013 | Mathews | H04W 4/06 455/418 |
| 2013/0346173 A1* | 12/2013 | Chandoor | G06Q 20/322 705/14.17 |
| 2014/0193049 A1* | 7/2014 | Gibson | G06K 9/00013 382/124 |

FOREIGN PATENT DOCUMENTS

JP  H10-161823 A  6/1998

* cited by examiner

*Primary Examiner* — Iriana Cruz
(74) *Attorney, Agent, or Firm* — Oliff PLC

(57) ABSTRACT

A data processing apparatus includes a first limit unit, an acquisition unit, a registration unit, and a second limit unit. If user authentication has been performed for a user by using acquired account information, the first limit unit limits a service to be provided, in accordance with a use limit that is preset for each of authenticated users. If the user authentication has not been performed for the user, the acquisition unit acquires biological information of the user. The registration unit registers the acquired biological information and a use status of the service in association with each other in a database. The second limit unit limits the service to be provided, in accordance with the use status corresponding to the acquired biological information.

6 Claims, 8 Drawing Sheets

FIG. 6

| ACCOUNT CLASSIFICATION | BIOLOGICAL INFORMATION | USER ID | ACCESS DATE AND TIME | NUMBER OF SHEETS OUTPUT | AMOUNT OF DATA USED | NUMBER OF FAX TRANSMISSIONS | ... |
|---|---|---|---|---|---|---|---|
| PERSONAL | — | P001 | 11/1/2015 12:00 | 300 | 10 | 100 | |
| PERSONAL | — | P002 | 10/1/2015 13:00 | 200 | 0 | 200 | |
| SHARED | FINGERPRINT DATA A | S001 | 10/2/2015 15:00 | 100 | 2 | 0 | |
| SHARED | FINGERPRINT DATA B | S002 | 12/11/2015 13:00 | 0 | 0 | 0 | |

FIG. 7

| USER ID | NUMBER OF SHEETS CAPABLE OF BEING OUTPUT | ASSIGNED AMOUNT OF DATA TO BE STORED (GB) | NUMBER OF POSSIBLE FAX TRANSMISSIONS | ... |
|---|---|---|---|---|
| P001 | 5000 | 10 | UNLIMITED | |
| P002 | 1000 | 5 | UNLIMITED | |
| S* | 100 | 3 | 10 | |

FIG. 9

| PROCESS CLASSIFICATION | COPY | FAX | SCAN (EMAIL) | SCAN (STORE IN BOX) | SCAN (USB) | SCAN (TRANSLATE) | ... |
|---|---|---|---|---|---|---|---|
| MANAGEMENT TARGET | TO BE MANAGED | TO BE MANAGED | NOT TO BE MANAGED | TO BE MANAGED | NOT TO BE MANAGED | TO BE MANAGED | |

DATA PROCESSING APPARATUS, SYSTEM, AND METHOD FOR PROVIDING A SERVICE WITH A USE LIMIT THAT IS SET BASED ON ACQUIRED BIOLOGICAL INFORMATION

CROSS-REFERENCE TO RELATED APPLICATIONS

This application is based on and claims priority under 35 USC 119 from Japanese Patent Application No. 2016-044356 filed Mar. 8, 2016.

BACKGROUND

Technical Field

The present invention relates to a data processing apparatus, a system, a data processing method, and a non-transitory computer readable medium.

SUMMARY

According to an aspect of the invention, there is provided a data processing apparatus including a first limit unit, an acquisition unit, a registration unit, and a second limit unit. If user authentication has been performed for a user by using acquired account information, the first limit unit limits a service to be provided, in accordance with a use limit that is preset for each of authenticated users. If the user authentication has not been performed for the user, the acquisition unit acquires biological information of the user. The registration unit registers the acquired biological information and a use status of the service in association with each other in a database. The second limit unit limits the service to be provided, in accordance with the use status corresponding to the acquired biological information.

BRIEF DESCRIPTION OF THE DRAWINGS

An exemplary embodiment of the present invention will be described in detail based on the following figures, wherein:

FIG. 6 illustrates exemplary contents of a user management database;

FIG. 7 illustrates exemplary contents of a limit management database;

FIG. 9 illustrates exemplary contents of a management target table; and

DETAILED DESCRIPTION

1 Configuration

Figure 1:
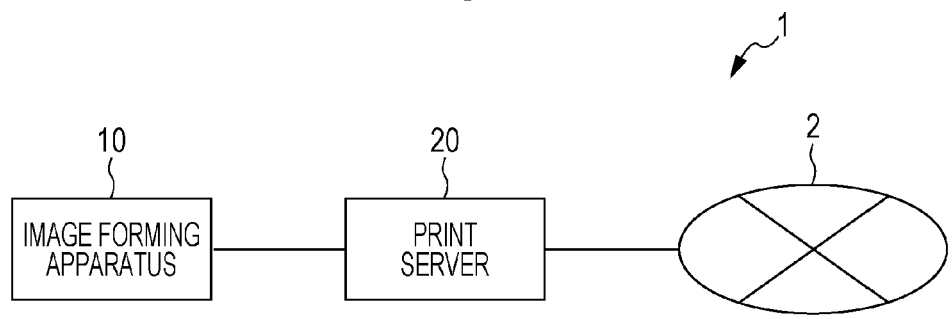
FIG. 1 schematically illustrates a configuration of a system.

FIG. 1 schematically illustrates a configuration of a system 1 according to an exemplary embodiment of the present invention. The system 1 includes an image forming apparatus 10 and a print server 20 (exemplary data processing apparatus). The image forming apparatus 10 is an apparatus that provides a user with a service for copying, scanning, facsimiling, printing (outputting image data to a medium), or the like. The image forming apparatus 10 performs processes including an image forming process (printing process) for forming an image on a medium and an image reading process for reading an image formed on a medium. Such processes are performed at the time the service for copying, scanning, facsimiling, printing, or the like is provided to the user.

The image forming apparatus 10 is used by multiple users. In the image forming apparatus 10, a personal account is created for each of the users, and user authentication is performed on the basis of account information regarding the personal account. By checking a user authentication history, a manager grasps a use status of each of the users and sets a use limit on a service for each of the users. The print server 20 controls a process according to a request for the process to the image forming apparatus 10. A communication line 2 includes at least one of a line to the Internet, a line to a mobile communication network, a telephone line, and the like. The print server 20 is connected to the communication line 2.

Figure 2:
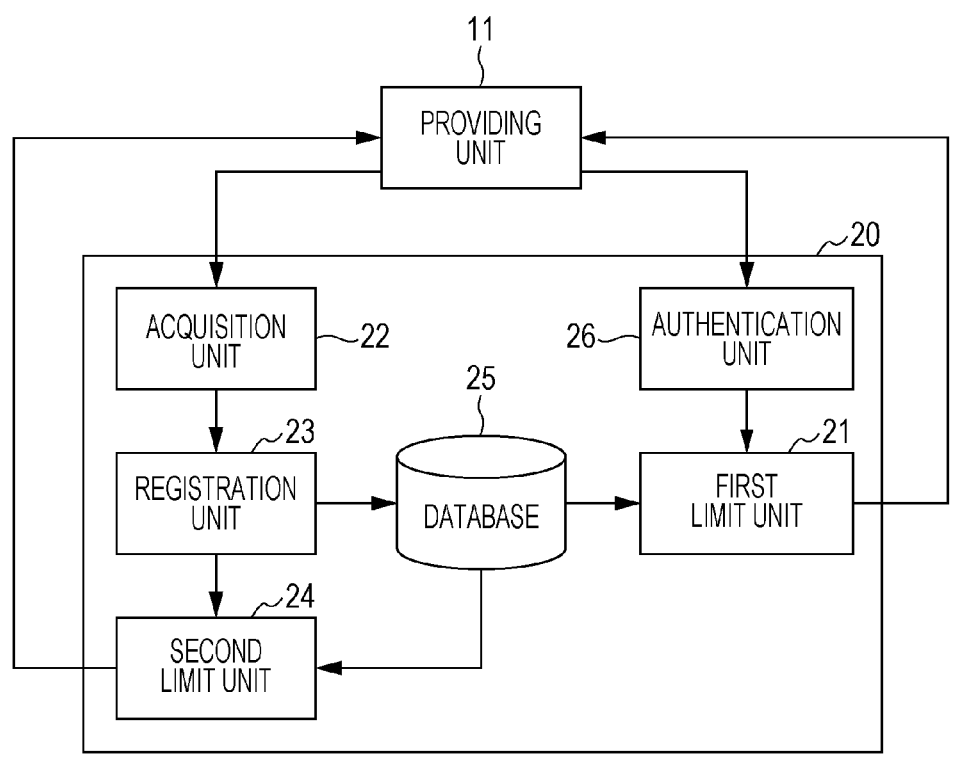
FIG. 2 illustrates a functional configuration of the system.

FIG. 2 illustrates an exemplary functional configuration of the system 1. The print server 20 includes a first limit unit 21, an acquisition unit 22, a registration unit 23, a second limit unit 24, a database 25, and an authentication unit 26. If user authentication is performed for a user by using acquired account information, the first limit unit 21 limits a service to be provided, in accordance with the use limit preset for each of authenticated users. If user authentication has not been performed for the user, the acquisition unit 22 acquires user's biological information. The registration unit 23 registers the acquired biological information and a use status of the service in association with each other in the database 25. In accordance with the use status corresponding to the acquired biological information, the second limit unit 24 limits the service to be provided. The authentication unit 26 performs user authentication by using the acquired account information. A providing unit 11 provides the service related to an image reading process.

Figure 3:
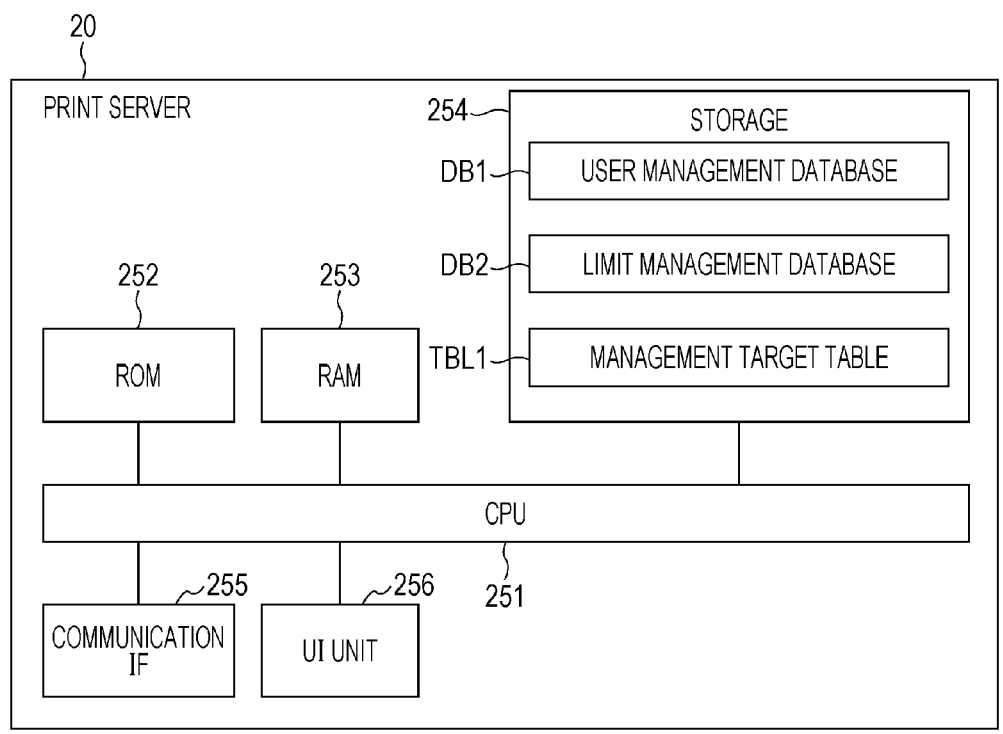
FIG. 3 illustrates a hardware configuration of a print server.

FIG. 3 illustrates an exemplary hardware configuration of the print server 20. The print server 20 includes a central processing unit (CPU) 251, a read only memory (ROM) 252, a random access memory (RAM) 253, a storage 254, a communication interface (IF) 255, and a user interface (UI) unit 256. The CPU 251 is a control device (processor) that controls each unit of the print server 20. The ROM 252 is a non-volatile memory device that stores programs and data. The RAM 253 is a main, volatile memory device that functions as a workspace at the time the CPU 251 executes programs. The storage 254 is an auxiliary, non-volatile memory device that stores programs and data. The storage 254 stores a user management database DB1, a limit management database DB2, and a management target table TBL1. The communication IF 255 is an interface used to perform communication through the communication line 2 and is particularly an interface used to perform communication with the image forming apparatus 10 in this example. The UI unit 256 includes a touch screen and a key pad, for example.

In this example, upon the programs stored in the storage 254 being executed by the CPU 251, the functions illustrated in FIG. 2 are implemented. The CPU 251 executing the programs is an example corresponding to the first limit unit 21, the acquisition unit 22, the registration unit 23, and the second limit unit 24. The storage 254 is an example of the database 25. The image forming apparatus 10 is an example of the providing unit 11.

Figure 4:
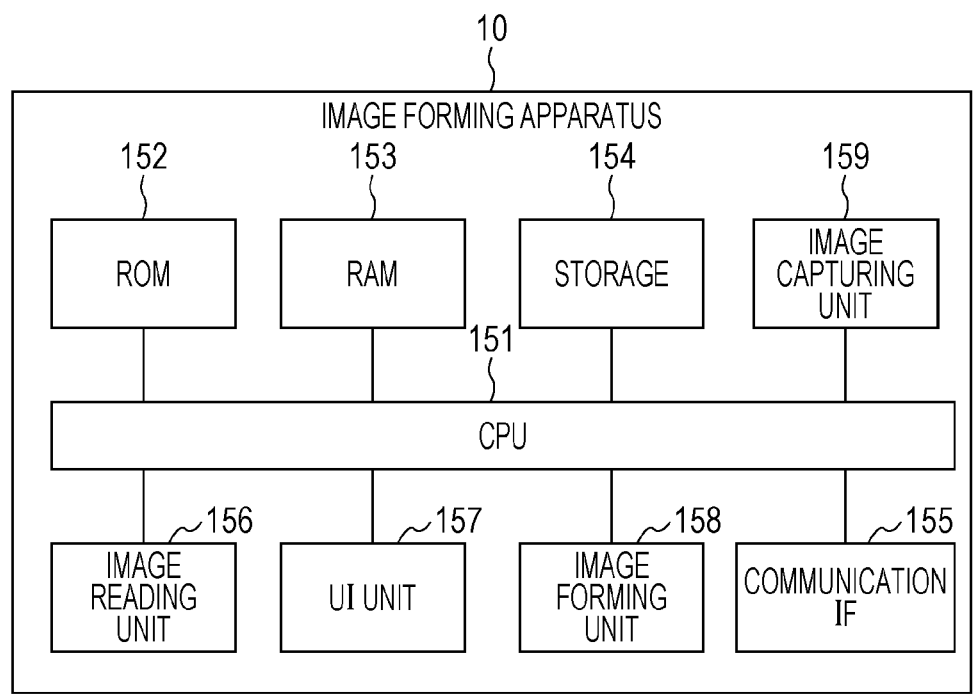
FIG. 4 illustrates a hardware configuration of an image forming apparatus.

FIG. 4 illustrates an exemplary hardware configuration of the image forming apparatus 10. The image forming apparatus 10 includes a CPU 151, a ROM 152, a RAM 153, a storage 154, a communication IF 155, an image reading unit 156, a UI unit 157, an image forming unit 158, and an image capturing unit 159. The CPU 151 is a control device (processor) that controls each unit of the image forming apparatus 10. The ROM 152 is a non-volatile memory device that stores programs and data. The RAM 153 is a main, volatile memory device that functions as a workspace at the time the CPU 151 executes programs. The storage 154 is an auxiliary, non-volatile memory device that stores programs and data. The communication IF 155 is an interface used to perform communication through the communication line 2 and is particularly an interface used to perform communication with the print server 20 in this example.

The image reading unit 156 performs an image reading process for reading an image on a document by using, for example, a charge coupled device (CCD) system. The UI unit 157 includes a touch screen and a key pad, for example. The image forming unit 158 forms an image in accordance with image data on a medium, such as a sheet of paper, by using, for example, an electrophotography system. Note that the above systems for reading an image and forming an image are examples, and other systems may be employed.

The image capturing unit 159 is an image capturing unit that captures an image of a user. In this example, the image capturing unit 159 is installed at a position where an image of the user's face is to be captured and outputs image data representing the captured user's face. The image data output from the image capturing unit 159 is used as biological information for performing biometric authentication. The image capturing unit 159 may be built in the image forming apparatus 10 or may be externally attached to the image forming apparatus 10 by using an interface, such as a universal serial bus (USB).

2 Operation 2-1 First Exemplary Operation

The image forming apparatus 10 is used by multiple users. The users are broadly divided into users whose personal accounts are registered in advance and other users. When a user whose personal account is registered in advance uses the image forming apparatus 10, the user performs user authentication by using the personal account. On the other hand, a user who does not have a personal account uses the image forming apparatus 10 while unauthenticated or uses the image forming apparatus 10 by using a shared account or a guest account.

Personal accounts are registered in advance in the image forming apparatus 10 by a manager or users. Specifically, the manager or users input account information including user identifications (IDs), passwords, and the like through the UI unit 157, and the CPU 151 causes the input account information to be stored in a predetermined database. At this time, the manager may set a use limit on the image forming apparatus 10 for each of the users. Examples of the use limit include the upper limit number of sheets of paper to be output, the upper limit amount of data to be stored, and the upper limit number of facsimile (fax) transmissions.

In the case of performing user authentication, a user performs an operation for user authentication through the UI unit 157 of the image forming apparatus 10. Specifically, for example, the user may input a user ID and a password. The CPU 151 of the image forming apparatus 10 checks the input user ID and password against those in the predetermined database, thereby performing user authentication.

Then, by using the UI unit 157, the user issues a request for using a service (e.g., copying, facsimiling, scanning (email), or scanning (storing in a box)) that the user wishes to use. Upon the request for using the service being issued by the user through the UI unit 157, the CPU 151 of the image forming apparatus 10 generates a request for performing a process. The generated request for performing the process is transmitted to the print server 20.

Figure 5:
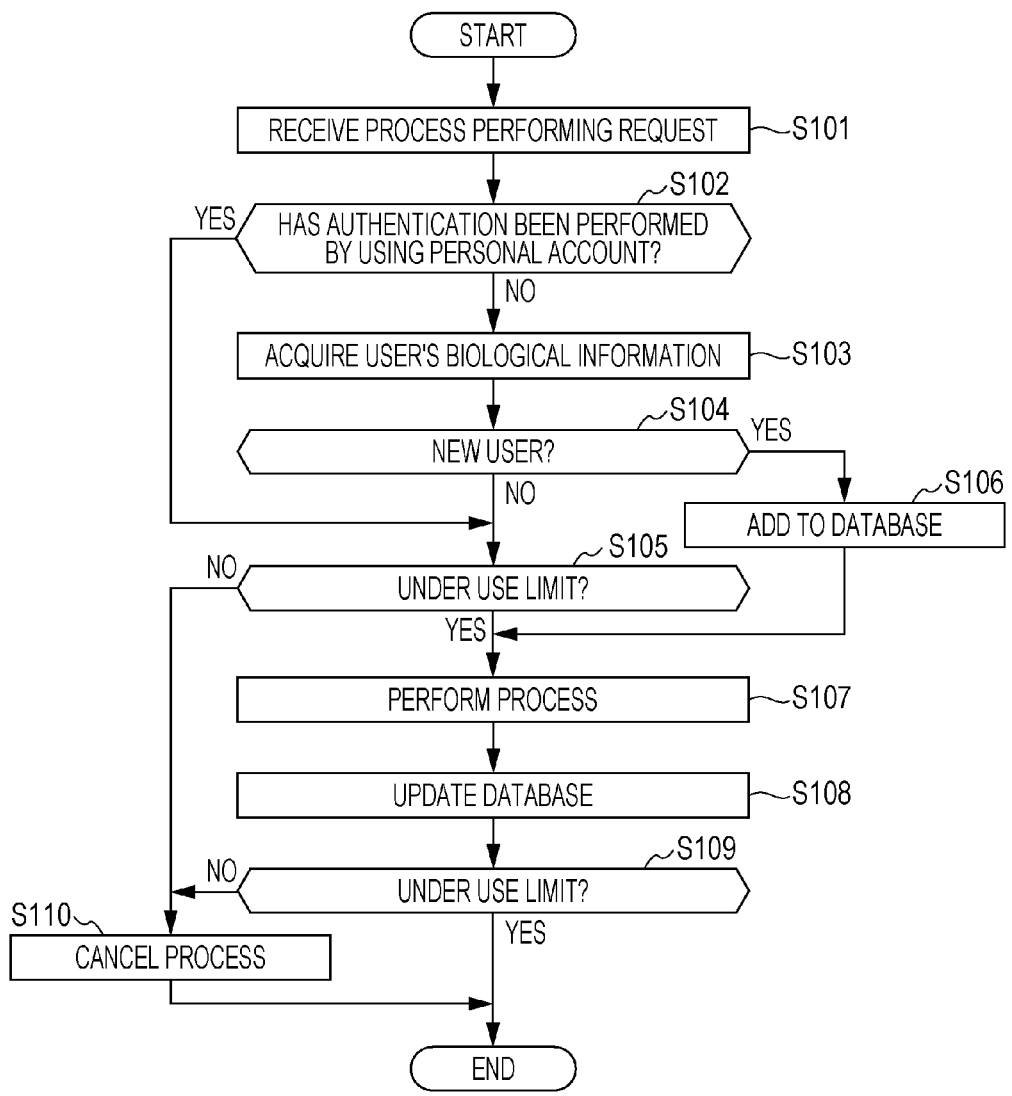
FIG. 5 is a flowchart illustrating an exemplary process performed by the print server.

FIG. 5 is a flowchart illustrating the flow of the process performed by the CPU 251 of the print server 20. In step S101, the CPU 251 receives the request for performing the process from the image forming apparatus 10. In step S102, on the basis of information acquired from the image forming apparatus 10, the CPU 251 determines whether user authentication has been performed by using a personal account. If the user authentication has been performed by using the personal account (step S102; YES), the CPU 251 skips step S103 and step S104 and proceeds to step S105. On the other hand, if the user authentication has not been performed by using the personal account, that is, if the image forming apparatus 10 is used by an unauthenticated user or a user using a shared account or a guest account (step S102; NO), the CPU 251 proceeds to step S103.

In step S103, the CPU 251 controls the image forming apparatus 10 to acquire user's biological information. In the exemplary embodiment, the CPU 251 acquires image data of the user's face as the biological information. In step S104, the CPU 251 checks the acquired biological information against information in a database in order to determine whether or not the user is a new user. This determination is made depending on whether the acquired biological information is registered in the user management database DB1. If the acquired biological information is not registered in the user management database DB1, the user is determined to be a new user. On the other hand, if the acquired biological information is registered in the user management database DB1, the user is determined not to be a new user. If the user is determined to be a new user in step S104, the CPU 251 proceeds to step S106. On the other hand, if the user is determined not to be a new user in step S104, the CPU 251 proceeds to step S105.

FIG. 6 illustrates exemplary contents of the user management database DB1. As illustrated, this database stores items such as "account classification", "biological information", "user ID", "access date and time", "number of sheets output", "amount of data used", and "number of fax transmissions" in association with each other. Among these items, the item "account classification" stores information indicating the classification of accounts, such as "personal" and "shared". The item "biological information" stores users' biological information. The biological information is not stored for users whose "account classification" is "personal" and is stored for users whose "account classification" is "shared" or "guest". Note that in the exemplary embodiment, the account classification is indicated as "shared" also in the case where the image forming apparatus 10 is used by an unauthenticated user. The item "user ID" stores identification information for identifying the users. In this example, character strings starting with "P" are assigned to the personal accounts as the user IDs, and character strings starting with "S" are assigned to the shared accounts as the user IDs.

The item "access date and time" stores information indicating dates and times the respective users have accessed the image forming apparatus 10 most recently. The items "number of sheets output", "amount of data used", and "number of fax transmissions" store information (hereinafter referred to as "use status information") indicating the use status of a service for each of the users. In this example, the item "number of sheets output" stores information indicating the numbers of sheets output as a result of using the service by the respective users. The item "amount of data used" stores information indicating the amounts of data stored in a memory region as a result of using the service by the respective users. The item "number of fax transmissions" stores information indicating the numbers of fax transmissions performed by the respective users. The information stored in the user management database DB1 is not limited to the above items, and the user management database DB1 may include other items.

Referring back to FIG. 5, in step S105 though step S110, the CPU 251 specifies, among the pieces of the use status information stored in the user management database DB1, use status information that satisfies a predetermined condition and limits the service to be provided to the user corresponding to the specified use status information. Specifically, first, in step S105, the CPU 251 determines whether or not the user's use status is under the use limit. This determination is made by comparing the use status information stored in the user management database DB1 with limit information stored in the limit management database DB2. If the use status is under the use limit set by the manager, the CPU 251 starts performing the process. On the other hand, if the use status is over the use limit, the CPU 251 cancels performing the process. That is, if the user's use status is under the use limit in step S105, the CPU 251 proceeds to step S107. If the user's use status is over the use limit, the CPU 251 proceeds to step S110.

FIG. 7 illustrates exemplary contents of the limit management database DB2. As illustrated, this database stores items, such as "user ID", "number of sheets capable of being output", "assigned amount of data to be stored (gigabyte, GB)", and "number of possible fax transmissions", in association with each other. Among these items, the item "user ID" stores identification information for identifying the users. In FIG. 7, "S*" indicates a user whose user ID starts with "S". The items "number of sheets capable of being output", "assigned amount of data to be stored (GB)", and "number of possible fax transmissions" store limit information indicating a use limit on a service for each of the users. The use limit is set by the manager of the image forming apparatus 10 or a user having a similar role (any of the manager and such a user is hereinafter referred to as a manager). If the use limit is not set individually, default values may be applied to the limit information. In this example, the item "number of sheets capable of being output" stores information indicating the upper limit number of sheets to be output. The item "assigned amount of data to be stored (GB)" stores information indicating the upper limit assigned amount of data to be stored. The item "number of possible fax transmissions" stores information indicating the upper limit number of fax transmissions. The information to be stored in the limit management database DB2 is not limited to the above items, and the limit management database DB2 may include other items.

Referring back to FIG. 5, in step S107, the CPU 251 starts performing the process in accordance with the process performing request received in step S101. In this example, the CPU 251 instructs the image forming apparatus 10 to execute the process. For example, in the case where the process accompanies storing a file, such as the case of a process of scanning and storing a file, the CPU 251 causes the image forming apparatus 10 to perform a scanning process to generate a file and stores the generated file in a folder that has been created for each of the user IDs.

In step S108, the CPU 251 updates the user management database DB1 in accordance with the result of performing the process. That is, the CPU 251 registers the use status information and information indicating the access date and time in the user management database DB1 in association with the user ID. Then, in step S109, the CPU 251 determines whether or not the user's use status is under the use limit. This determination is made by comparing the use status information stored in the user management database DB1 with the limit information stored in the limit management database DB2. If the use status is under the use limit set by the manager (step S109; YES), the CPU 251 ends the process. On the other hand, if the use status is over the use limit (step S109; NO), the CPU 251 proceeds to step S110 and cancels performing the process that has been requested to the image forming apparatus 10 (step S110). Note that the CPU 251 may successively update the user management database DB1 when the process is being performed and may stop the process at the time the user's use status goes over the use limit.

In addition, in step S106, the CPU 251 adds the user's biological information acquired in step S103 to the user management database DB1. At this time, the CPU 251 issues a new user ID and registers the user ID in the user management database DB1 in association with the acquired biological information. The CPU 251 also registers the information indicating the access date and time in the user management database DB1 in association with the user ID. At this time, the CPU 251 may notify the user of the issued user ID by displaying the user ID on the UI unit 157 of the image forming apparatus 10, for example. Upon finishing step S106, the CPU 251 proceeds to step S107.

In order to perform user authentication, it is necessary for the manager or user to create a personal account in advance. Creating a personal account may sometimes be complicated for the manager or user. In particular, at a work site, for example, where those who are concerned among various contractors use an apparatus in turn for each step, many users use the apparatus only for a short period, and it may be troublesome to create a personal account each time a new user uses the apparatus. Accordingly, an unauthenticated user is allowed to use the apparatus, or a user using a shared account or a guest account is allowed to use the apparatus.

In the case where the apparatus is used by an unauthenticated user or by a user using a shared account or a guest account, it is not possible to manage the use status for each of the users. Accordingly, it is not possible to set a limit on the number of sheets to be output, a limit on the amount of data to be stored, or the like for each of the users. In such a case, a use limit might be set in units of unauthenticated users or users using a shared account. However, in this case, there is the following concern. If some users use a service, other users might not be able to use the service owing to the use limit. In addition, if a user whose personal account has not been registered uses a service accompanying storing a file, the user has to specify the storing location and to overwrite the file name with a unique one, and these procedures might sometimes be complicated. In contrast, in the exemplary embodiment, it is possible to provide a use limit for each of the users without a complicated procedure of creating a personal account of a user even if the user who does not have a personal account uses a service.

2-2 Second Exemplary Operation

Figure 8:
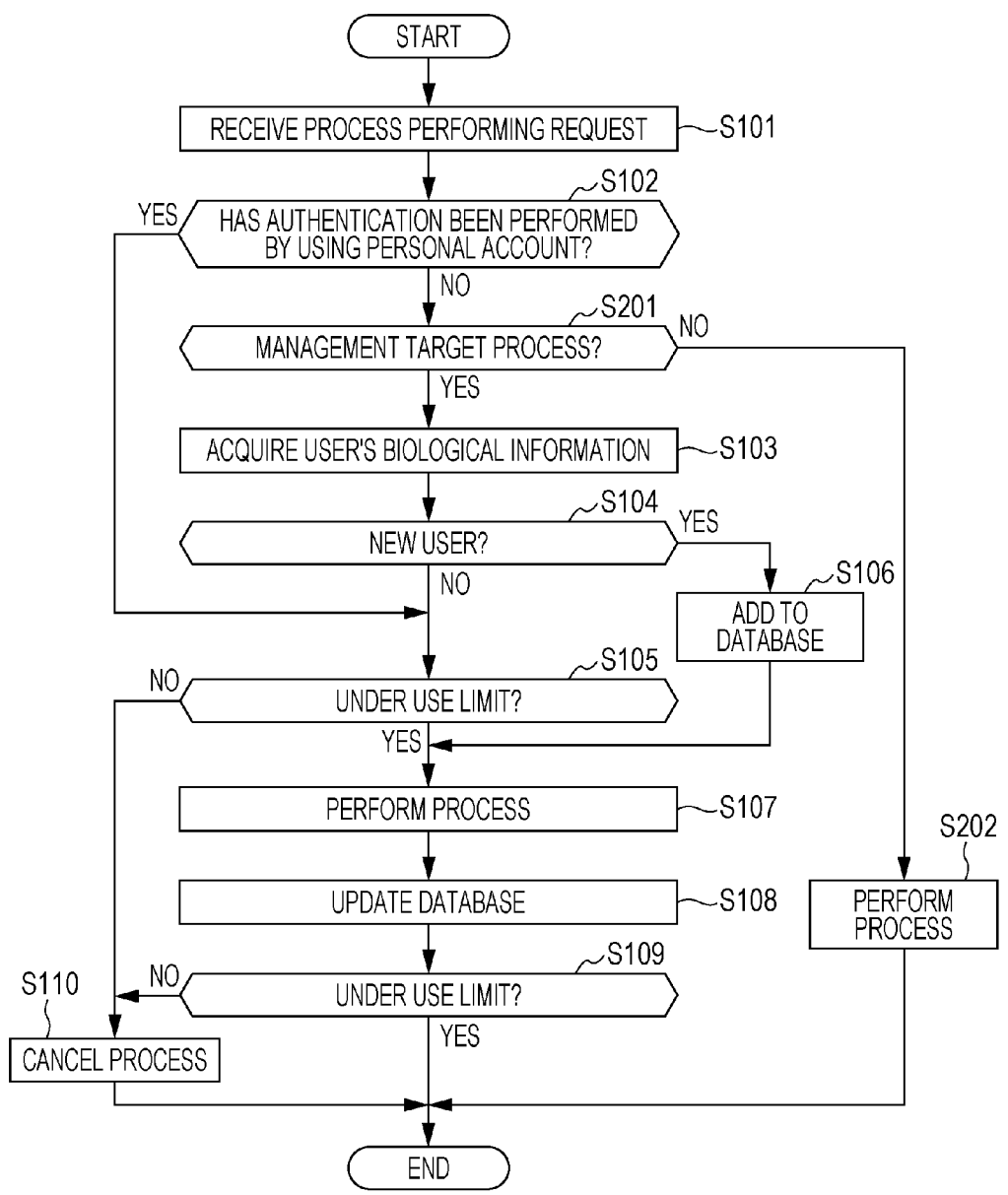
FIG. 8 is a flowchart illustrating an exemplary process performed by the print server.

FIG. 8 is a flowchart illustrating an exemplary process performed by the print server 20. The process illustrated in FIG. 8 is different from that illustrated in FIG. 5 in that step S201 is performed after step S102 and that step S202 is performed if the determination result in step S201 is NO.

In step S201, the CPU 251 determines whether or not the process that has been requested in step S101 to be performed is a management target process. This determination is made by referring to the management target table TBL1. If the process is the management target process (step S201; YES), the CPU 251 proceeds to step S103 (acquiring biological information). On the other hand, if the process is not the management target process (step S201; NO), the CPU 251 proceeds to step S202 and instructs the image forming apparatus 10 to perform the process corresponding to a service requested by the user without acquiring biological information or determining whether or not the use status is under the use limit.

FIG. 9 illustrates exemplary contents of the management target table TBL1. As illustrated, this table stores items "process classification" and "management target" in association with each other. Among these items, the item "process classification" stores information for identifying the process (e.g., the name of the process). The item "management target" stores information indicating whether or not the process is a management target process. The manager may set in advance which process is the management target process.

In this exemplary operation, if user authentication has not been performed by using a personal account and the process to be performed is the management target process, the user's biological information is acquired (steps S102, S201, and S103). That is, the CPU 251 acquires the biological information if performing the management target process and does not acquire the biological information if performing a process that is not a management target process.

2-3 Third Exemplary Operation

Figure 10:
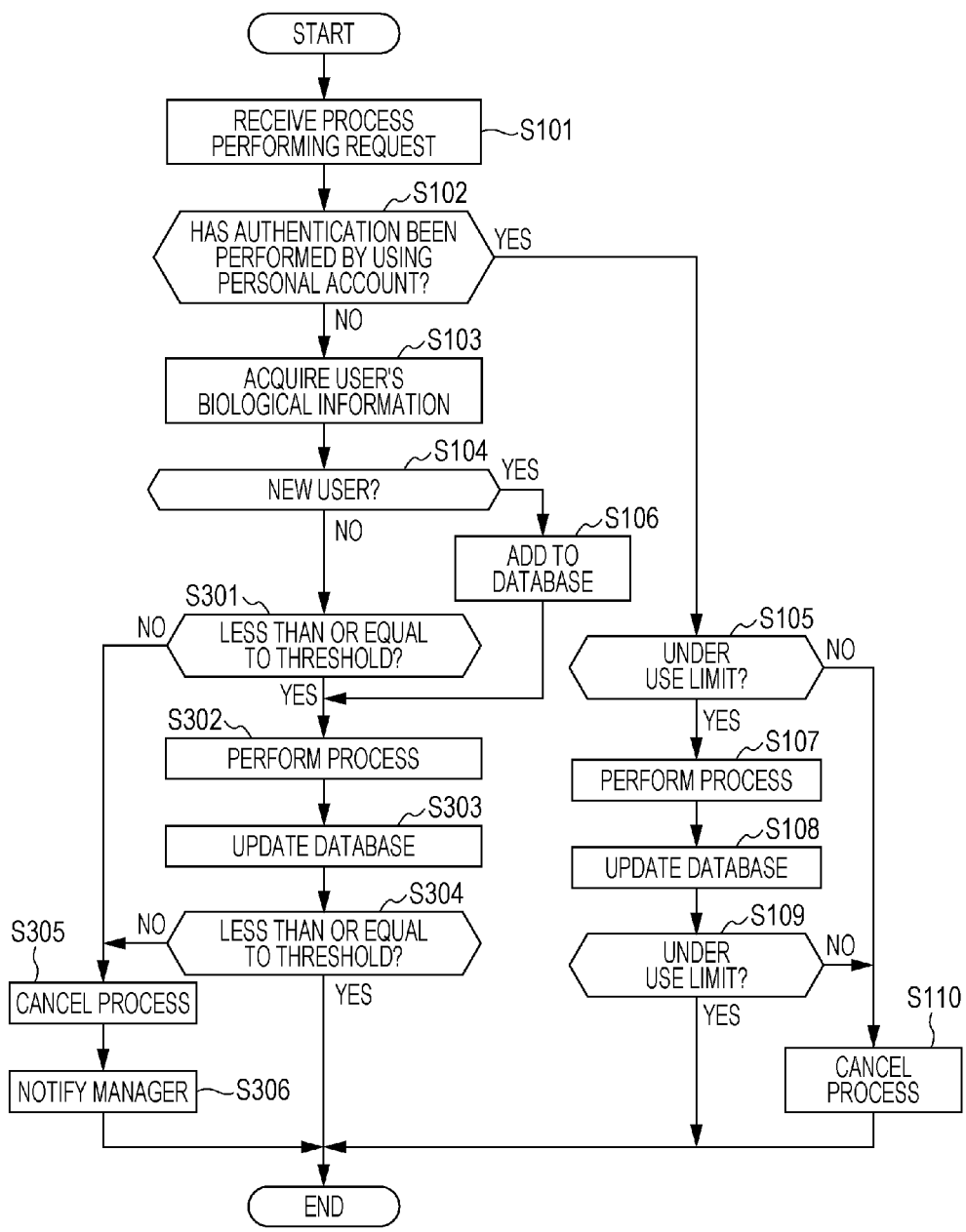
FIG. 10 is a flowchart illustrating an exemplary process performed by the print server.

FIG. 10 is a flowchart illustrating an exemplary process performed by the print server 20. The process illustrated in FIG. 10 is different from that illustrated in FIG. 5 in that steps S301 through step S306 are performed if the determination result in step S104 is NO, without proceeding to step S105.

In step S301, the CPU 251 determines whether or not in the user's use status is less than or equal to a predetermined threshold. If the use status is less than or equal to the threshold (step S301; YES), the CPU 251 proceeds to step S302. On the other hand, if the use status exceeds the threshold (step S301; NO), the CPU 251 proceeds to step S305.

In step S302, the CPU 251 instructs the image forming apparatus 10 to perform the process in accordance with the process performing request received in step S101. In step S303, the CPU 251 updates the user management database DB1 in accordance with the result of performing the process. Upon performing the process, in step S304, the CPU 251 determines whether or not the user's use status is less than or equal to the threshold. If the use status is less than or equal to the threshold (step S304; YES), the CPU 251 ends the process. On the other hand, if the use status exceeds the threshold (step S304; NO), the CPU 251 proceeds to step S305.

In step S305, the CPU 251 cancels performing the process corresponding to the process performing request received instep S101. In step S306, the CPU 251 performs a process to notify the manager. For example, the CPU 251 may perform a process to notify the manager that the use status has exceeded the threshold by email or the like and to ask the manager to create a personal account. In addition to notifying the manager, the CPU 251 may display a screen for personal account registration on an operation screen of the image forming apparatus 10 and may allow the user to register the personal account. In this case, a default use limit for the personal account is applied until the manager changes individual limit settings.

In this exemplary operation, if the user is an unauthenticated user or a user using a shared account or a guest account, the CPU 251 determines whether or not the use status is less than or equal to the preset threshold at timings prior to performing the requested process and upon updating the user management database DB1 after performing the process. The CPU 251 encourages a user whose use status has exceeded the threshold, i.e., a heavy user, to create a personal account.

3 Modifications

The above-described exemplary embodiment is merely an example of an implementation of the present invention and may be modified as follows. In addition, the above-described exemplary embodiment and the following modifications may be implemented in combination as necessary.

1 The image data of the user's face has been used as the user's biological information in the above exemplary embodiment. However, the biological information is not limited to the image data of a face. The biological information may be, for example, information indicating a fingerprint, iris, vein, or vocal cord. For example, a vein authentication apparatus may be externally attached to the image forming apparatus 10, and the CPU 251 may use information on the user's vein as the biological information.

2 In Third Exemplary Operation above in the exemplary embodiment, the CPU 251 cancels performing the process when the user's use status exceeds the threshold. In this mode, independent values may be set as the threshold used to determine whether to notify the manager and the limit value used to determine whether to cancel the process. In this case, the CPU 251 checks the threshold and then checks the limit value, and if the user's use status exceeds the limit value, the CPU 251 stops the process.

3 In the above-described exemplary embodiment, when updating the user management database DB1 (step S108 in FIG. 5) after performing the process, the CPU 251 may write the access date and time and may delete, from the user management database DB1, a user who has not accessed the image forming apparatus 10 for a predetermined period among unauthenticated users or users who have used a shared account. Since the image forming apparatus 10 is used by multiple users, the number of users might possibly exceed the registration number of users that may be stored in the user management database DB1. According to this mode, users who have not used the image forming apparatus 10 for the predetermined period are deleted from the database.

4 In the above-described exemplary embodiment, the image forming apparatus 10 and the print server 20 are formed as independent apparatuses. However, the functions of the print server 20 according to the above-described exemplary embodiment may be implemented by the image forming apparatus 10. For example, the functions of the print server 20 according to the above-described exemplary embodiment may be provided as a print driver.

5 The image forming apparatus 10 may be a printer that forms an image by using a system other than the electrophotography system. In addition, the image forming apparatus 10 may form monochrome images or may form color images.

6 In the above-described exemplary embodiment, programs executed by the CPU 151 of the image forming apparatus 10 and programs executed by the CPU 251 of the print server 20 may be downloaded through a communication line, such as a line to the Internet. In addition, the programs may be provided by being recorded on a computer readable recording medium, such as a magnetic recording medium (e.g., magnetic tape or magnetic disk), an optical recording medium (e.g., optical disc), a magneto-optical recording medium, or a semiconductor memory.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing apparatus comprising:
    a processor that is configured to serve at least as:
        a first limit unit that limits a service to be provided, in accordance with a use limit that is preset for each of authenticated users, if user authentication has been performed for a user by using acquired account information;
        an acquisition unit that (i) acquires biological information of the user if the user authentication has not been performed for the user and a process to be performed is a predetermined process, and analyze the biological information to determine if the user is a new user; and that (ii) does not acquire biological information of the user if the user authentication has not been performed for the user and the process is not the predetermined process;
        a registration unit that registers the acquired biological information and a use status of the service in association with each other in a database in the event it is determined that the user is a new user; and
        a second limit unit that limits the service to be provided, in accordance with the use status corresponding to the acquired biological information.

2. The data processing apparatus according to claim 1, wherein the second limit unit limits the service to be provided to the user corresponding to the biological information, the user having a use status registered in the database satisfying a predetermined condition.

3. The data processing apparatus according to claim 1, wherein the second limit unit encourages creation of an account of a user whose use status registered in the database exceeds a predetermined threshold.

4. A system comprising:
    the data processing apparatus according to claim 1; and
    an image forming apparatus configured to serve at least as a providing unit that provides the service related to an image reading process.

5. A data processing method comprising:
    limiting a service to be provided, in accordance with a use limit that is preset for each of authenticated users, if user authentication has been performed for a user by using acquired account information;
    acquiring biological information of the user if the user authentication has not been performed for the user and a process to be performed is a predetermined process, and analyzing the biological information to determine if the user is a new user;
    not acquiring biological information of the user if the user authentication has not been performed for the user and the process is not the predetermined process;
    registering the acquired biological information and a use status of the service in association with each other in a database in the event it is determined that the user is a new user; and
    limiting the service to be provided, in accordance with the use status corresponding to the acquired biological information.

6. A non-transitory computer readable medium storing a program causing a computer to execute a process for data processing, the process comprising:
    limiting a service to be provided, in accordance with a use limit that is preset for each of authenticated users, if user authentication has been performed for a user by using acquired account information;
    acquiring biological information of the user if the user authentication has not been performed for the user and a process to be performed is a predetermined process, and analyzing the biological information to determine if the user is a new user;
    not acquiring biological information of the user if the user authentication has not been performed for the user and the process is not the predetermined process;
    registering the acquired biological information and a use status of the service in association with each other in a database in the event it is determined that the user is a new user; and
    limiting the service to be provided, in accordance with the use status corresponding to the acquired biological information.

* * * * *